March 1, 1966 L. KRAUS ETAL 3,237,962
WHEEL SUSPENSION
Filed Oct. 23, 1963 2 Sheets-Sheet 1

INVENTORS
LUDWIG KRAUS
FRANZ G. F. BEHLES
BY Dicke & Craig
ATTORNEYS

INVENTORS.
LUDWIG KRAUS
FRANZ G. F. BEHLES
BY Dicker & Craig
ATTORNEYS.

United States Patent Office 3,237,962
Patented Mar. 1, 1966

3,237,962
WHEEL SUSPENSION
Ludwig Kraus, Stuttgart-Sillenbuch, and Franz G. F. Behles, Stuttgart-Schonberg, Germany, assignors to Daimler-Benz Aktiengesellschaft, Stuttgart-Unterturkheim, Germany
Filed Oct. 23, 1963, Ser. No. 318,434
Claims priority, application Germany, Oct. 24, 1962,
D 40,122
8 Claims. (Cl. 280—96.2)

The present invention relates to an independent wheel suspension for motor vehicle wheels, especially for the steerable front wheels of a motor vehicle with front wheel drive, whereby the wheel carrier is guided at the vehicle frame and spring-supported with respect thereto within a lower plane by a triangular guide structure formed by a strut and an arm of a cross stabilizer and within an upper plane by a similar triangular guide structure.

Independent wheel suspensions by means of triangular guide members and/or similar guide structures such as, for example, transversely disposed leaf springs, are known per se in the art. However, the present invention is concerned with an improvement in such independent wheel suspensions and especially with the lower triangular guide member. In particular, the force requirement necessary for the steering is to be reduced in accordance with the present invention.

According to the present invention, this aim is solved in connection with the aforementioned independent wheel suspensions in that the guide strut of the lower triangularly-shaped guide member is disposed forwardly in the driving direction and the stabilizer arm extends from a point on this strut close to the respective wheel rearwardly and inwardly of the vehicle, and that the point of pivotal connection of the guide strut at the vehicle superstructure is disposed in front of the wheel axis.

By reason of the particular arrangement of the forward guide strut in accordance with the present invention, a larger moment occurs at the guide strut of the wheel disposed on the outside of the curve whereby the positive caster of this wheel is reduced or goes back to zero or possibly also reverses into a negative caster as will be explained more fully hereinafter. As a result thereof, the force required for steering is considerably reduced.

This effect is further improved in that the stabilizer arm is pivotally connected at the guide strut with the aid of a bushing or sleeve made of elastic material such as, for example, rubber, and this elastic sleeve—in relation to the driving direction—is provided rearwardly thereof with relatively soft abutments and forwardly thereof with relatively hard abutments. Similarly, the cross stabilizer may be secured at the vehicle frame with the aid of sleeves or bushings made of elastic material and these sleeves—in relation to the vehicle longitudinal axis—are constructed rearwardly thereof relatively soft and forwardly thereof relatively hard. It is achieved thereby that the lower triangular guide member of the wheel disposed on the outside of the curve is able to deflect or yield rearwardly under the influence of the lateral force by a noticeable amount with respect to the upper wheel guidance whereby the change in caster is further increased.

With one construction according to the present invention, the angle subtended between the inwardly extending guide strut and the axis of the stabilizer arm extending rearwardly from the point of engagement is at the most a right angle. The stabilizer arm is also toggled or cranked inwardly approximately in the center thereof. The possible steering deflection of the wheel is increased thereby. The tie-rod of the steering system is appropriately arranged parallel to the guide strut of the lower triangularly-shaped guide member. A relatively large effective lever arm results with maximum deflection at the inner wheel from the inclination of the tie-rod conditioned thereby. The steering thereby becomes less direct and also remains easy to handle.

In principle, it is feasible to combine the lower triangular guide member of the present invention with any suitable upper wheel guide means. Thus, for example, a triangular guide member may also be used for the upper wheel guide means which is constructed approximately mirror-image-like to the lower guide means. However, a triangular guide structure is also proposed for the upper guide means according to the present invention which consists of a guide strut extending in the vehicle transverse direction and of a further strut extending forwardly and inwardly from the first-mentioned strut from a point close to the respective wheel whereby both struts of the upper guide structure are swingable or pivotable at the vehicle frame about a common axis extending parallel to the vehicle longitudinal axis. This construction is more simple and fulfills the same purpose.

Accordingly, it is an object of the present invention to provide an independent wheel suspension of the type mentioned hereinabove which is simple, advantageous in operation, and avoids the shortcomings encountered with the prior art systems.

It is another object of the present invention to provide an independent wheel suspension, particularly for the steerable front wheels of a front wheel drive motor vehicle, which is so constructed and arranged as to facilitate steering of the vehicle.

A further object of the present invention resides in the provision of an independent wheel suspension for the steerable wheels of a motor vehicle which reduces the force required for steering the vehicle.

Another object of the present invention resides in the provision of an independent wheel suspension for the driven steerable front wheels of a motor vehicle which exhibits improved steering characteristics as compared to the prior art systems.

A still further object of the present invention resides in the provision of an independent wheel suspension for the steerable wheels of a motor vehicle which automatically adjusts the caster angle during steering deflections of the wheels and permits an accurate predetermination of the automatic caster adjustment.

Still a further object of the present invention resides in the provision of an independent wheel suspension for the steerable wheels of a motor vehicle which permits very large steering deflections with the application of relatively smaller forces.

Still another object of the present invention resides in the provision of an independent wheel suspension for the steerable front wheels of a motor vehicle which is very simple in construction, easy to install, adjust and disassemble, and assures easy steering under all driving conditions.

These and other objects, features and advantages of the present invention will become more obvious from the following description when taken in connection with the accompanying drawing which shows, for purposes of illustration only, one embodiment in accordance with the present invention, and wherein FIGURE 1 is an end elevational view of the wheel suspension in accordance with the present invention with parts broken away for sake of clarity;

Figure 1:
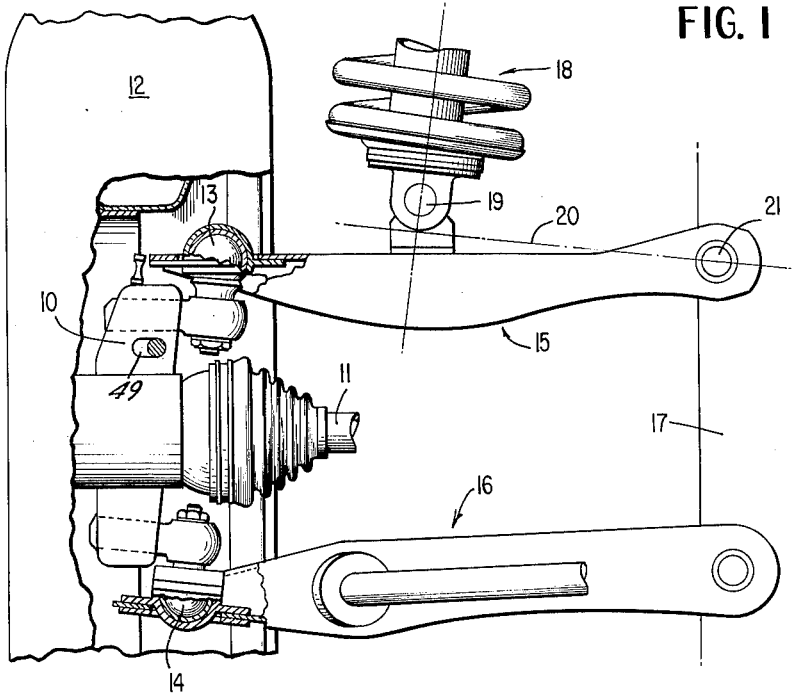

Referring now to the drawing wherein like reference numerals are used throughout the various views to designate like parts, and more particularly to FIGURE 1, reference numeral 10 designates therein the wheel carrier of a front wheel 12 driven in any suitable manner by means of a half-axle shaft 11. The wheel carrier 10 is guided with respect to the vehicle superstructure 17 such as the frame or body parts of a self-supporting type body construction by way of conventional ball joints 13 and 14 and by means of an upper triangular guide assembly generally designated by reference numeral 15 and by means of a lower triangular guide assembly generally designated by reference numeral 16 according to the present invention. A spring element generally designated by reference numeral 18 and constructed in the instant case as a coil-spring shock-absorber leg engages at the upper triangular guide assembly 15. However, instead a hydraulic-pneumatic spring leg may also be arranged at that place. The pivotal connecting point 19 of the spring element 18 at the upper triangular guide member 15 is disposed above the line 20 perpendicular to the spring axis which passes through the pivotal connecting point 21 of the upper triangular guide structure 15 at the relatively fixed vehicle frame.

Figure 2:
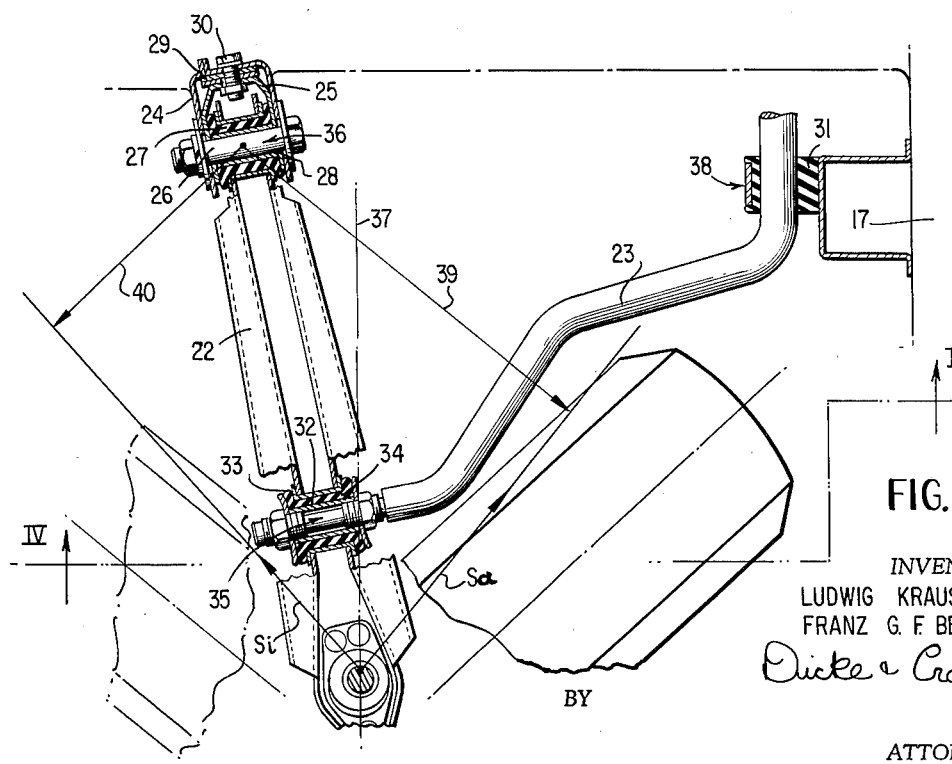
FIGURE 2 is a plan view, partly in cross section, of the lower triangular guide member of the independent wheel suspension in accordance with the present invention with the wheel substantially fully deflected in the counterclockwise direction as viewed in this figure.
Figure 4:
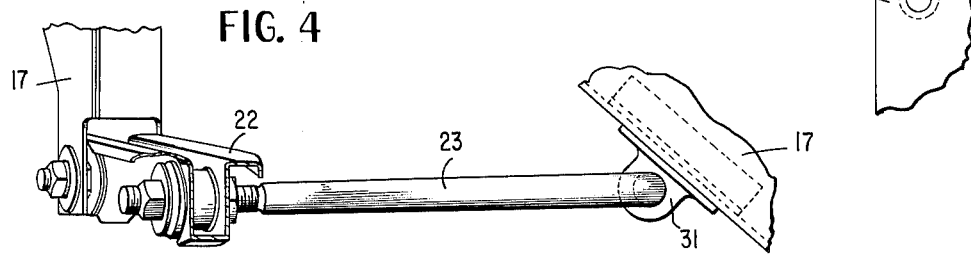
FIGURE 4 is a partial elevational view of the lower guide member taken along line IV—IV of FIGURE 2.

As shown in FIGURES 2 and 4, the lower triangular guide structure 16 is constituted by a forwardly disposed guide strut 22 and by an arm 23 of a cross stabilizer extending from the guide strut 22 rearwardly and inwardly. The point of connection generally designated by reference numeral 35 of the stabilizer arm 23 at the guide strut 22 is disposed as close as possible to the respective wheel carrier 10. In order that the front wheel 12 may attain a sufficiently large steering deflection, the stabilizer arm 23 is cranked or toggled inwardly approximately in the center thereof.

The guide strut 22 is inclined with respect to the vehicle transverse direction to such an extent that the point of pivotal connection thereof generally designated by reference numeral 36 at the vehicle frame 17 is disposed in front of the wheel axis 37 when the wheel is in its normal straight-drive position, the wheel 12 being shown in FIGURE 2 in a deflected position. The bearing place generally designated by reference numeral 38 for the cross stabilizer 23 may be spaced from the vehicle longitudinal center plane a further distance than the point of pivotal connection 36 of the guide strut 22.

The guide strut 22 is supported in a frame part 24 of U-shaped construction. The support takes place by means of a bow-shaped member 25 also of U-shape which includes a cross bolt 26. The guide strut 22 is arranged on the cross bolt 26 by means of an elastic sleeve or bushing 27. Elongated apertures 28 for the accommodation of the cross bolt 26 are arranged within the frame part 24. Shim plates 29 are arranged between the bow-shaped part 25 and the frame part 24, and the bow-shaped part 25 is tightened against the shim plates 29 by means of a bolt or screw 30. A simple camber adjustment of the wheel is possible by means of the shim plates 29.

The cross stabilizer 23 is supported at the vehicle frame 17 by means of elastic sleeves or bushings 31. These sleeves 31 are preferably so constructed that the part disposed behind the cross stabilizer is relatively thicker, that is, therefore, softer than the part disposed in front of the stabilizer. The connection of the stabilizer arm 23 with the guide strut 22 takes place also by means of an elastic sleeve or bushing 32 which is provided on both sides thereof with elastic abutments 33 and 34. Also in this case, the rearwardly disposed abutment 34 is softer than the forwardly disposed abutment 33.

It may be readily seen from FIGURE 2 that by reason of the inclination of the guide strut 22, a larger moment about the point of pivotal connection 36 of the guide strut 22 is produced by a lateral force extending in the wheel axis. The lateral force $S_a$, with the wheel disposed on the outside of the curve, that is, with the wheel 12 deflected until its axis 37 coincides with the force $S_a$, has a large lever arm 39 in relation to the point of pivotal connection 36 is at any rate already larger than the lateral force $S_i$ with the wheel disposed on the inside of the curve, that is, with the wheel in the position of FIGURE 2 in which its axis 37 coincides with the lateral force $S_i$. With the wheel disposed on the inside of the curve, the lateral force $S_i$ itself as well as also the lever arm 40 thereof with respect to the point of pivotal connection 36 of the guide strut 22 are considerably smaller.

Consequently, a large moment is exerted in the clockwise direction as viewed in FIGURE 2 on the lower triangular guide structure 16 of the wheel disposed on the outside of the curve while driving through a curve. This moment displaces the entire lower triangular guide structure 16 about the pivotal connecting point 36 of the guide strut 22 which is favored by the described elastic construction of the bearing places 38 of the cross stabilizer and the connection between the arm 23 and the guide strut 22. Consequently, the impact point, which is disposed in the plane of the road surface, of the axis passing through both ball joints 13 and 14 of the wheel carrier 10 moves rearwardly; for the upper triangular guide member 15 is not stressed and loaded in this sense and practically maintains its pre-existing position. The displacement of the impact point produces a reduction of the caster which with an appropriate corresponding construction, may drop to zero or even may change over into a negative caster. The required steering force is reduced thereby; for as is known, a caster produces while driving through a curve a moment acting on the steering system in opposition to the applied steering force.

Figure 3:
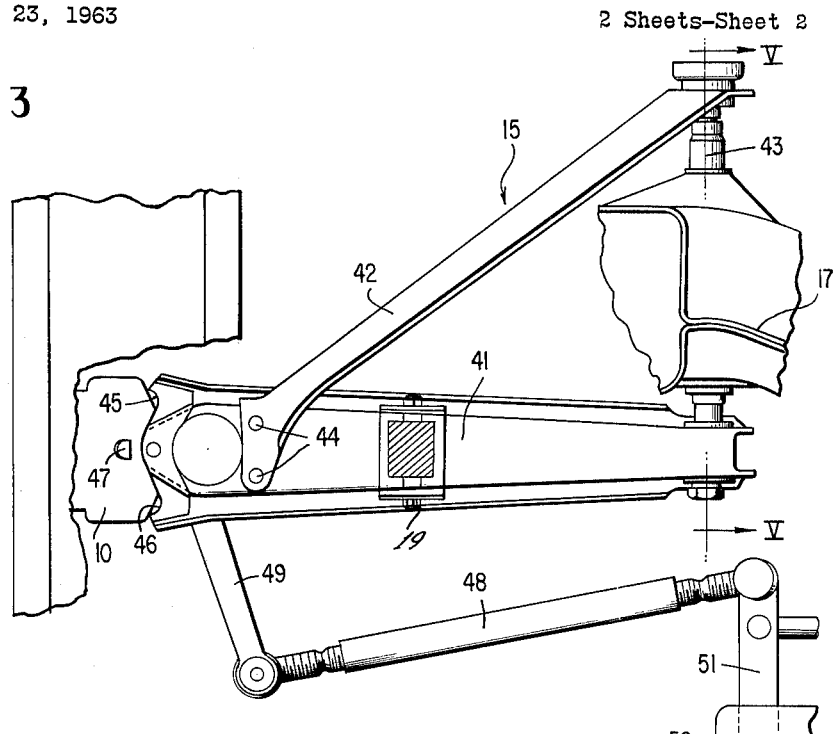
FIGURE 3 is a plan view of the upper triangular guide member of the independent wheel suspension according to the present invention with the wheel in its normal position.

According to FIGURE 3, the upper triangular guide structure generally designated by reference numeral 15 is formed by a guide strut 41 and by a further strut 42 extending from the strut 41 forwardly and inwardly. The guide strut 41 is disposed in the vehicle transverse direction. Both struts 41 and 42 are pivotally connected at the vehicle frame 17 of the motor vehicle about a common axis 43 which extends parallel to the vehicle longitudinal direction. The forward strut 42 is secured at the guide strut 41 together with the carrier joint flange for the upper ball joint 13, for example, by rivets 44. The upper guide strut 41 is provided at the end thereof facing the wheel with two abutments 45 and 46 which cooperate with a pin 47 on the wheel carrier pin 10 for a limitation of the steering deflection.

It may be clearly seen from FIGURE 3 that the tie-rod 48 of the steering system extends at an inclination to the vehicle transverse direction. This inclination is approximately the same as the inclination of the lower guide strut 22. The tie-rod 48 engages with a lever 49 which is arranged and secured at the wheel carrier 10 in any conventional manner not illustrated in detail. The tie-rod 48 is actuated in a manner known per se by way of a steering gear arm 51 from the steering gear 50.

Figure 5:
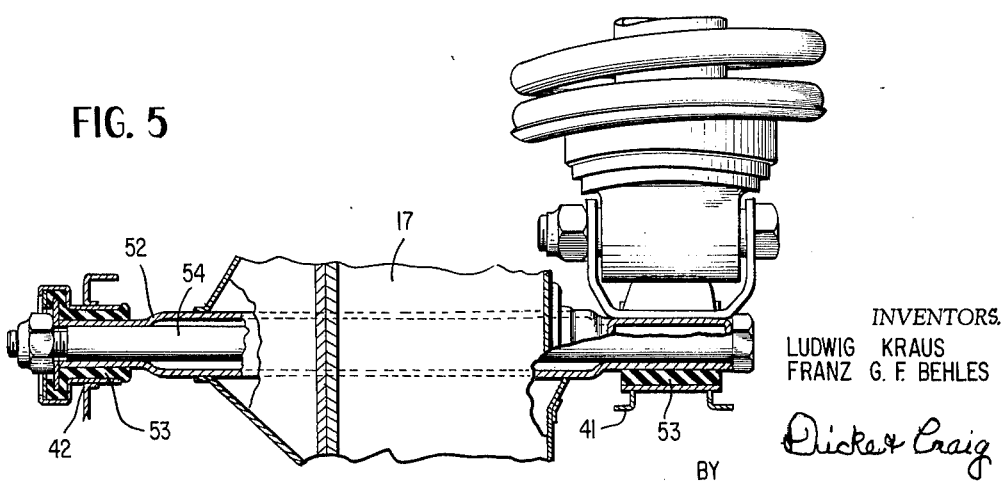
FIGURE 5 is a cross sectional view taken along line V—V of FIGURE 3.

As shown in FIGURE 5, the common pivot bearing axis 43 of FIGURE 3 for the upper triangular guide structure 15 is formed by a bolt 54 which is arranged within a tubularly-shaped part 52 of the frame 17. The ends of this bolt 54 again receive by way of elastic sleeves or bushings 53 both the upper guide strut 41 as well as the forwardly directed strut 42.

Since the relatively fixed part 17 of the motor vehicle may be a frame part or a part of the body in case of a self-supporting type body construction, the term "vehicle superstructure" is used in this specification and the following claims to describe such relatively fixed part.

While we have shown and described one embodiment in accordance with the present invention, it is understood that the same is not limited thereto, but is susceptible of numerous changes and modifications within the spirit and scope thereof, and we therefore do not wish to be limited to the details shown and described herein, but intend to cover all such changes and modifications as may be encompassed by the scope of the appended claims.

We claim:

1. An independent wheel suspension for the wheels of a vehicle having a vehicle superstructure and stabilizer means, comprising:

wheel carrier means, means for guiding said wheel carrier means in a lower plane with respect to said vehicle superstructure including lower approximately triangular guide means having essentially linear strut means connected between said wheel carrier means and said vehicle superstructure and an arm portion of said stabilizer means connected to said strut means, means for guiding said wheel carrier means in an upper plane with respect to said vehicle superstructure including upper guide means, the strut means of said lower triangular guide means extending, as viewed in the driving direction, inwardly and toward the front of the vehicle and the arm portion of said stabilizer means extending rearwardly and inwardly of the vehicle from adjacent the point of connection of said strut means with the respective wheel carrier means, and connecting means disposed toward the front of the vehicle from the transverse wheel axis pivotally connecting said strut means at said vehicle superstructure, and elastic bushing means for pivotally connecting the arm portion of said stabilizer means at said strut means, said elastic bushing means being provided, as viewed in the driving direction, with relatively soft abutment means in the rear thereof and relatively hard abutment means in front thereof.

2. An independent wheel suspension for the wheels of a vehicle having a vehicle superstructure and stabilizer means, comprising:

wheel carrier means, means for guiding said wheel carrier means in a lower plane with respect to said vehicle superstructure including lower approximately triangular guide means having essentially linear strut means connected between said wheel carrier means and said vehicle superstructure and an arm portion of said stabilizer means connected to said strut means, means for guiding said wheel carrier means in an upper plane with respect to said vehicle superstructure including upper guide means, the strut means of said lower triangular guide means extending, as viewed in the driving direction, inwardly and toward the front of the vericle and the arm portion of said stabilizer means extending rearwardly and inwardly of the vehicle from adjacent the point of connection of said strut means with the respective wheel carrier means, and connecting means disposed toward the front of the vehicle from the transverse wheel axis for pivotally connecting said strut means at said vehicle superstructure, and elastic bushing means for pivotally connecting the arm portion of said stabilizer means at said strut means, said elastic bushing means being provided, as viewed in the driving direction, with relatively soft abutment means in the rear thereof and relatively hard abutment means in front thereof, and further elastic bushing means for supporting said stabilizer means at said vehicle superstructure, said last-mentioned bushing means being constructed, in relation to the vehicle longitudinal axis, relatively soft in the rear thereof and relatively hard in front thereof.

3. An independent wheel suspension for the wheels of a vehicle having a vehicle superstructure and stabilizer means, comprising:

wheel carrier means, means for guiding said wheel carrier means in a lower plane with respect to said vehicle superstructure including lower approximately triangular guide means having essentially linear strut means connected between said wheel carrier means and said superstructure and an arm portion of said stabilizer means connected to said strut means, means for guiding said wheel carrier means in an upper plane with respect to said vehicle superstructure including upper guide means, the strut means of said lower triangular guide means extended, as viewed in the driving direction, inwardly and toward the front of the vehicle and the arm portion of said stabilizer means extending rearwardly and inwardly of the vehicle from adjacent the point of connection of said strut means with the respective wheel carrier means, and connecting means disposed toward the front of the vehicle from the transverse wheel axis for pivotally connecting said strut means at said vehicle superstructure, and elastic bushing means for pivotally connecting the arm portion of said stabilizer means at said strut means, said elastic bushing means being provided, as viewed in the driving direction, with relatively soft abutment means in the rear thereof and relatively hard abutment means in front thereof, and further elastic bushing means for supporting said stabilizer means at said vehicle superstructure, said last-mentioned bushing means being constructed, in relation to the vehicle longitudinal axis, relatively soft in the rear thereof and relatively hard in the front thereof, steering tie-rod means operatively connected with said wheel carrier means and extending approximately parallel to the strut means of said lower triangular guide means.

4. An independent wheel suspension for the front wheels of a vehicle with front wheel drive having a vehicle superstructure and stabilizer means, comprising:

wheel carrier means;

means for guiding said wheel carrier means in a lower plane with respect to said vehicle superstructure including essentially linear strut means connected at one end thereof to the lower end of said wheel carrier means and at the other end thereof to said vehicle superstructure and an arm portion of said stabilizer means connected adjacent said one end of said strut means;

means for guiding said wheel carrier means in an upper plane with respect to said vehicle superstructure including upper approximately triangular guide means connected between the upper end of said wheel carrier means and said vehicle superstructure;

the strut means of said lower guide means extending forwardly and inwardly of the vehicle from said wheel carrier means and the arm portion of said stabilizer means extending rearwardly and inwardly of the vehicle, as seen in the driving direction;

connecting means disposed toward the front of the vehicle from the wheel axis pivotally connecting said strut means at said vehicle superstructure;

elastic bushing means pivotally connecting the arm portion of said stabilizer means at said strut means, said elastic bushing means being provided as viewed in the driving direction, with relatively soft abutment means on the rear side of said strut means and relatively hard abutment means on the front side of said strut means.

5. An independent wheel suspension for the front wheels of a vehicle wiht front wheel drive having a vehicle superstructure and stabilizer means, comprising:
wheel carrier means;
means for guiding said wheel carrier means in a lower plane with respect to said vehicle superstructure including essentially linear strut means connected at one end thereof to the lower end of said wheel carrier means and at the other end thereof to said vehicle superstructure and an arm portion of said stabilizer means connected adjacent said one end of said strut means;
means for guiding said wheel carrier means in an upper plane with respect to said vehicle superstructure including upper approximately triangular guide means connected between the upper end of said wheel carrier means and said vehicle superstructure;
the strut means of said lower guide means extending forwardly and inwardly of the vehicle from said wheel carrier means and the arm portion of said stabilizer means extending rearwardly and inwardly of the vehicle, as seen in the driving direction;
connecting means disposed toward the front of the vehicle from the wheel axis pivotally connecting said strut means at said vehicle superstructure;
elastic bushing means pivotally connecting the arm portion of said stabilizer means at said strut means, said elastic bushing means being provided, as viewed in the driving direction, with relatively soft abutment means on the rear side of said strut means, and relatively hard abutment means on the front side of said strut means;
the strut means of said lower guide means forming an angle in the horizontal plane with the transverse wheel axis so that a larger moment of force is created about the point of connection between said strut means and the vehicle superstructure due to lateral forces on the wheels for a wheel turned inwardly of the vehicle as compared to a wheel turned outwardly thereof, as seen in the driving direction.

6. An independent wheel suspension for the front wheels of a vehicle with front wheel drive having a vehicle superstructure and stabilizer means, comprising:
wheel carrier means;
means for guiding said wheel carrier means in a lower plane with respect to said vehicle superstructure including essentially linear strut means connected at one end thereof to the lower end of said wheel carrier means and at the other end thereof to said vehicle superstructure and an arm portion of said stabilizer means connected adjacent said one end of said strut means;
means for guiding said wheel carrier means in an upper plane with respect to said vehicle superstructure including upper approximately triangular guide means connected between the upper end of said wheel carrier means and said vehicle superstructure;
the strut means of said lower guide means extending forwardly and inwardly of the vehicle from said wheel carrier means and the arm portion of said stabilizer means extending rearwardly and inwardly of the vehicle, as seen in the driving direction;
connecting means disposed toward the front of the vehicle from the wheel axis pivotally connecting said strut means at said vehicle superstructure;
elastic bushing means pivotally connecting the arm portion of said stabilizer means at said strut means, said elastic bushing means being provided, as viewed in the driving direction, with relatively soft abutment means on the rear side of said strut means and relatively hard abutment means on the front side of said strut means;
the strut means of said lower guide means forming an angle in the horizontal plane with the transverse wheel axis so that a larger moment of force is created about the point of connection between said strut means and the vehicle superstructure due to lateral forces on the wheels for a wheel turned inwardly of the vehicle as compared to a wheel turned outwardly thereof, as seen in the driving direction;
further elastic bushing means supporting said stabilizer means at said vehicle superstructure having one side thereof substantially more resilient than the other side thereof.

7. An independent wheel suspension for the front wheels of a vehicle with front wheel drive having a vehicle superstructure and stabilizer means, comprising:
wheel carrier means,
means for guiding said wheel carrier means in a lower plane with respect to said vehicle superstructure including essentially linear strut means connected at one end thereof to the lower of said wheel carrier means and at the other end thereof to said vehicle superstructure and an arm portion of said stabilizer means connected adjacent said one end of said strut means;
means for guiding said wheel carrier means in an upper plane with respect to said vehicle superstructure including upper approximately triangular guide means connected between the upper end of said wheel carrier means and said vehicle superstructure;
the strut means of said lower guide means extending forwardly and inwardly of the vehicle from said wheel carrier means and the arm portion of said stabilizer means extending rearwardly and inwardly of the vehicle from adjacent said wheel carrier means and the arm portion of said stabilizer means extending rearwardly and inwardly of the vehicle, as seen in the driving direction;
connecting means disposed toward the front of the vehicle from the wheel axis pivotally connecting said strut means at said vehicle superstructure;
elastic bushing means pivotally connecting the arm portion of said stabilizer means at said strut means, said elastic bushing means being provided, as viewed in the driving direction, with relatively soft abutment means on the rear side of said strut means and relatively hard abutment means on the front side of said strut means;
the strut means of said lower guide means forming an angle in the horizontal plane with the transverse wheel axis so that a larger moment of force is created about the point of connection between said strut means and the vehicle superstructure due to lateral forces on the wheels for a wheel turned inwardly of the vehicle as compared to a wheel turned outwardly thereof, as seen in the driving direction;
further elastic bushing means supporting said stabilizer means at said vehicle superstructure having one side thereof substantially more resilient than the other side thereof;
said stabilizer means being positioned eccentrically within said further elastic bushing means with the larger thickness thereof facing rearwardly of the vehicle, as seen in the driving direction.

8. An independent wheel suspension for the front wheels of a vehicle with front wheel drive having a vehicle superstructure and stabilizer means, comprising:
wheel carrier means;
means for guiding said wheel carrier means in a lower plane with respect to said vehicle superstructure including essentially linear strut means connected at one end thereof to the lower end of said wheel carrier means and at the other end thereof to said vehicle superstructure and an arm portion of said stabilizer means connected adjacent said one end of said strut means;
means for guiding said wheel carrier means in an upper plane with respect to said vehicle superstructure including upper approximately triangular guide means connected between the upper end of said wheel carrier means and said vehicle superstructure;

the strut means of said lower guide means extending forwardly and inwardly of the vehicle from said wheel carrier means and the arm portion of said stabilizer means extending rearwardly and inwardly of the vehicle, as seen in the driving direction;

connecting means disposed toward the front of the vehicle from the wheel axis pivotally connecting said strut means at said vehicle superstructure;

elastic bushing means pivotally connecting the arm portion of said stabilizer means at said strut means, said elastic bushing means being provided, as viewed in the driving direction, with relatively soft abutment means on the rear side of said strut means and relatively hard abutment means on the front side of said strut means;

the strut means of said lower guide means forming an angle in the horizontal plane with the transverse wheel axis so that a larger moment of force is created about the point of connection between said strut means and the vehicle superstructure due to lateral forces on the wheels for a wheel turned inwardly of the vehicle as compared to a wheel turned outwardly thereof, as seen in the driving direction;

further elastic bushing means supporting said stabilizer means at said vehicle superstructure having one side thereof substantially more resilient than the other side thereof;

said stabilizer means being positioned eccentrically within said further elastic bushing means with the larger thickness thereof facing rearwardly of the vehicle, as seen in the driving direction;

said upper guide means being pivotally connected to said vehicle superstructure so as to be substantially incapable of angular deflection in a horizontal plane.

References Cited by the Examiner

UNITED STATES PATENTS

| | | |
|---|---|---|
| 2,840,385 | 6/1958 | Heftler. |
| 3,033,587 | 5/1962 | May _____ 280—96 |
| 3,105,699 | 10/1963 | Peras _____ 280—96 |

FOREIGN PATENTS 888,218   8/1953   Germany.

BENJAMIN HERSH, *Primary Examiner.*

KENNETH H. BETTS, MILTON BUCHLER,
*Examiners.*